US010286835B2

(12) United States Patent
Tzeng

(10) Patent No.: US 10,286,835 B2
(45) Date of Patent: May 14, 2019

(54) VEHICLE HEADLIGHT DEVICE AND VEHICLE

(71) Applicant: KAISTAR Lighting (Xiamen) Co., Ltd., Xiamen (CN)

(72) Inventor: Jimmy Tzeng, Xiamen (CN)

(73) Assignee: KAISTAR LIGHTING (XIAMEN) CO., LTD., Xiamen (CN)

( * ) Notice: Subject to any disclaimer, the term of this patent is extended or adjusted under 35 U.S.C. 154(b) by 137 days.

(21) Appl. No.: 15/607,749

(22) Filed: May 30, 2017

(65) Prior Publication Data

US 2018/0022266 A1    Jan. 25, 2018

(30) Foreign Application Priority Data

Jul. 19, 2016 (CN) .......................... 2016 1 0568960

(51) Int. Cl.
| | |
|---|---|
| *B60Q 1/14* | (2006.01) |
| *B60Q 1/04* | (2006.01) |
| *G06K 9/00* | (2006.01) |
| *G06K 9/20* | (2006.01) |
| *G06K 9/62* | (2006.01) |

(52) U.S. Cl.
CPC ........... *B60Q 1/143* (2013.01); *B60Q 1/0408* (2013.01); *G06K 9/00791* (2013.01);
(Continued)

(58) Field of Classification Search
CPC .................. B60Q 1/143; B60Q 1/0408; B60Q 2300/054; B60Q 2300/056;
(Continued)

(56) References Cited

U.S. PATENT DOCUMENTS

| | | | |
|---|---|---|---|
| 8,033,697 B2* | 10/2011 | Fang ..................... | B60Q 1/085 362/466 |
| 2011/0013412 A1* | 1/2011 | Kobayashi ............ | F21S 41/645 362/538 |

(Continued)

FOREIGN PATENT DOCUMENTS

| | | |
|---|---|---|
| CN | 1162714 A | 10/1997 |
| CN | 203605125 U | 5/2014 |

(Continued)

*Primary Examiner* — Laura K Tso
(74) *Attorney, Agent, or Firm* — Hemisphere Law, PLLC; Zhigang Ma

(57) ABSTRACT

A vehicle headlight device is disposed with an optical lens group to concentrate light emitted from a light source as incident light, the image sensor detects a dynamic image in front of the vehicle and sends the image to an image process and control component for analyzing and processing to obtain corresponding control signal, the control signal controls an optical switch array device to process the incident light by spatial distribution modulation for obtaining an emission light with an optical distribution pattern corresponding to the dynamic image, therefore it is unnecessary to turn on/off the light source frequently but still can reinforce, weaken or prevent light projected on target areas in front of the vehicle, the driver can achieve the optimum view without affecting the vehicle ahead. Moreover, the invention further provides a vehicle such as a car adopting the vehicle headlight device.

15 Claims, 5 Drawing Sheets

(52) U.S. Cl.
CPC ....... *G06K 9/00825* (2013.01); *G06K 9/2027* (2013.01); *G06K 9/6202* (2013.01); *B60Q 2300/054* (2013.01); *B60Q 2300/056* (2013.01); *B60Q 2300/41* (2013.01); *B60Q 2300/42* (2013.01)

(58) Field of Classification Search
CPC ............ B60Q 2300/41; B60Q 2300/42; G06K 9/00791; G06K 9/00825; G06K 9/2027; G06K 9/6202
USPC .................................................. 362/459–549
See application file for complete search history.

(56) References Cited

U.S. PATENT DOCUMENTS

| | | | |
|---|---|---|---|
| 2014/0268837 A1* | 9/2014 | Simchak | B60Q 1/12 362/465 |
| 2015/0291081 A1* | 10/2015 | Kojima | B60Q 1/085 362/466 |
| 2015/0377445 A1* | 12/2015 | Chuang | B60Q 1/143 362/465 |
| 2016/0033102 A1* | 2/2016 | Hiratsuka | B60Q 1/085 362/466 |
| 2016/0152174 A1* | 6/2016 | Hagisato | B60Q 1/143 362/466 |
| 2016/0176335 A1* | 6/2016 | Hoshino | B60Q 1/143 362/466 |
| 2016/0250964 A1* | 9/2016 | Takagaki | B60Q 1/08 362/466 |
| 2016/0377251 A1* | 12/2016 | Kim | G06K 9/00791 362/466 |

FOREIGN PATENT DOCUMENTS

| | | |
|---|---|---|
| CN | 105253058 A | 1/2016 |
| CN | 105333377 A | 2/2016 |

* cited by examiner

VEHICLE HEADLIGHT DEVICE AND VEHICLE

TECHNICAL FIELD

The invention relates to the technical field of vehicle light, and more particularly to a vehicle headlight device and a vehicle adopting the vehicle headlight device.

DESCRIPTION OF RELATED ART

A vehicle headlight is applied to illuminate the road ahead during driving at night, but the glare will dazzle a driver of a vehicle passing by in the opposite direction lane, which would cause risks. A conventional vehicle headlight utilizes a high beam/low beam mode switching to solve the problem, the high beam mode can provide illumination with a long distance yet with visual obstacle caused by glare to the vehicle passing by in the opposite direction lane, thus the low beam mode needs to be adopted when a vehicle is approaching from the opposite direction, which can ensure a clear vision of the driver of the vehicle passing by in the opposite direction lane, but the low beam mode cannot provide an enough range for illumination during driving at a high speed or encountering a crooked road ahead, the response time of the driver driving with the low beam mode becomes short, which would cause risks as well.

Therefore, a related art provides matrix LED headlights to solve the problem. The matrix LED headlights are formed by several independently controlled LED lamp sets, each the LED lamp set is responsible for illuminating a certain area in front of the vehicle. Moreover, a camera is equipped to monitor traffic dynamics ahead, and after performing a signal processing and calculation on the monitored result, corresponding numbers of LED lamp sets are turned on/off, which can guarantee visuals of the driver of the vehicle passing by in the opposite direction lane as well as maintaining the long distance illumination, but the optical structure is relatively complex, an illumination area of each of the LED lamp sets can hardly be subdivided as well.

SUMMARY

Accordingly, in order to overcome drawbacks and shortcomings in the prior art, the invention provides a vehicle headlight device and a vehicle adopting the vehicle headlight device.

Specifically, a vehicle headlight device provided by an embodiment of the invention includes: a light source, an image sensor configured (i.e., structured and arranged) to detect a dynamic image in front of a vehicle; an image process and control component electrically connected to the image sensor and configured to analyze and process the dynamic image to thereby output a control signal; an optical lens group configured to concentrate light emitted from the light source as an incident light; and an optical switch array device electrically connected to the image process and control component and configured to process the incident light by spatial distribution modulation under the control of the control signal so as to obtain an emission light with an optical distribution pattern corresponding to the dynamic image and thereby reinforce, weaken or prevent illumination on a target area in front of the vehicle.

In an embodiment of the invention, the optical switch array device is a reflective-type optical processor, and the reflective-type optical processor is configured to process the incident light by reflective-type spatial distribution modulation under the control of the control signal.

In an embodiment of the invention, the reflective-type optical processor includes a digital micromirror device chip.

In an embodiment of the invention, the optical switch array device is a transmissive-type optical processor, and the transmissive-type optical processor is configured to process the incident light by transmissive-type spatial distribution modulation under the control of the control signal.

In an embodiment of the invention, the transmissive-type optical processor includes a transmissive-type liquid crystal panel.

In an embodiment of the invention, the optical switch array device is an opto-interrupter set, and the opto-interrupter set includes a plurality of independently controlled opto-interrupters. Each of the opto-interrupters is selectively turned on or turned off under the control of the control signal in order to permit or prevent passing of the incident light respectively.

In an embodiment of the invention, each of the opto-interrupters is a liquid crystal light valve.

In an embodiment of the invention, each of the opto-interrupters is a mechanically rotatable or slidable baffle, and the mechanically rotatable or slidable baffle is capable of rotating or sliding under the control of the control signal in order to be selectively turned on or turned off for permitting or preventing passing of the incident light.

In an embodiment of the invention, the image sensor includes a camera, the light source is a LED bulb, a high-intensity discharge bulb or a halogen bulb, the optical lens group is a convergent lens group.

Furthermore, an embodiment of the invention further provides a vehicle, including a vehicle body and any one of the previously mentioned vehicle headlight devices mounted on the vehicle body.

Furthermore, an embodiment of the invention further provides a vehicle headlight device, including a light source. The vehicle headlight device further includes an image sensor configured for detecting a dynamic image in front of a vehicle, an image process and control component electrically connected to the image sensor and configured for analyzing and processing the dynamic image to output a control signal, an optical processor electrically connected to the image process and control component and configured for modulating spatial distribution of the incident light under the control of the control signal to obtain an emission light with an optical distribution pattern corresponding to the dynamic image and thereby reinforce, weaken or prevent illumination on a target area in front of the vehicle. The optical processor is one of a reflective-type optical processor including a digital micromirror device chip and a lens scanning type optical processor including a lens group movable relative to the light source. The light source is a laser light source.

In an embodiment of the invention, the image sensor comprises a camera.

It can be known that according to the embodiments of the invention, the optical lens group disposed in the vehicle headlight device concentrates light emitted from the light source to be the incident light, the image sensor detects the dynamic image in front of the vehicle and sends the image to the image process and control component for analyzing and processing so as to obtain the corresponding control signal, then the optical switch array device is controlled by the control signal to process the incident light by spatial distribution modulation for obtaining the emission light with the optical distribution pattern corresponding to the dynamic image, therefore it is unnecessary to turn on/turn off the light source frequently but still can reinforce, weaken or prevent illumination on the target area in front of a vehicle, the driver can achieve the optimum view without affecting the vehicle ahead.

By the following detailed description with reference to accompanying drawings, other aspects and features of the invention will become apparent. However, it should be understood that, the drawings only are for the purpose of explanation and not as limiting the scope of the invention. It also be appreciated that, unless otherwise indicated, the drawings are not necessarily drawn to scale, they are merely trying to conceptually illustrate the structures and procedures described herein.

BRIEF DESCRIPTION OF THE DRAWINGS

In the following, with reference to accompanying drawings, concrete embodiments of the invention will be described in detail.

DETAILED DESCRIPTION OF PREFERRED EMBODIMENTS

Embodiments of the invention are described in detail with reference to the accompanying drawings as follows to better understand the previously mentioned objectives, features and advantages of the invention.

First Embodiment

Figure 1:
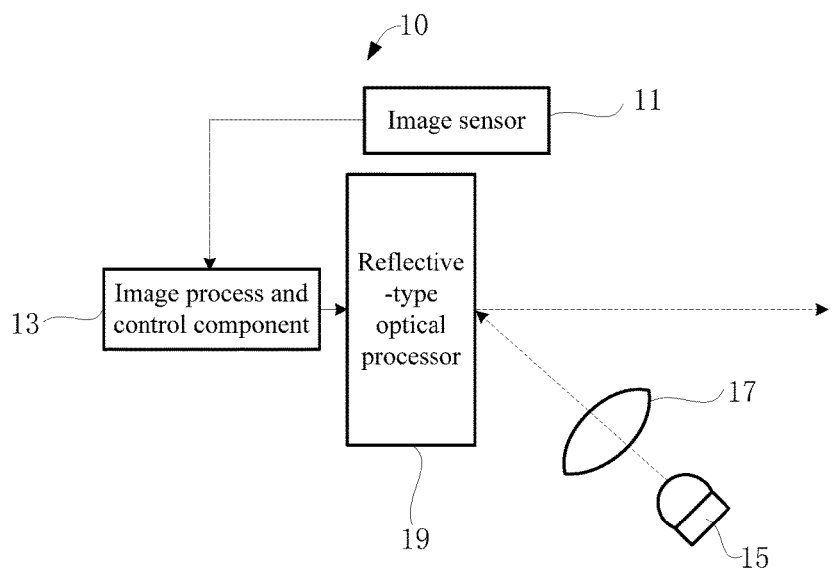
FIG. 1 is a principal structural schematic view of a vehicle headlight device according to a first embodiment of the invention.

Referring to FIG. 1, a vehicle headlight device 10 provided by a first embodiment of the invention includes an image sensor 11, an image process and control component 13, a light source 15, an optical lens group 17 and a reflective-type optical processor 19.

The image sensor 11 is configured to collect a dynamic image in front of a vehicle. In the illustrated embodiment, the image sensor 11 may be a camera such as an infrared camera. Moreover, the image sensor 11 can further be a combination of a camera and a distance detector, which can collect the dynamic image in front of the vehicle as well as measuring a distance from the vehicle to another vehicle, a pedestrian or an animal in the same direction lane or in an opposite direction lane ahead.

The image process and control component 13 is configured to receive the dynamic image collected by the image sensor 11 that will be analyzed and processed so as to output a control signal, which may include a processor chip such as an ARM microprocessor or a DSP processor. The image process and control component 13 analyzes and processes the dynamic image such as judging if a vehicle is driving in the opposite direction or in the same direction lane ahead, if a pedestrian or an animal is walking across the road, or if a crooked road appears ahead, and then generates a corresponding control signal as output according to the judging result.

The light source 15 is configured to provide light for illumination, which can be a LED bulb, a high-intensity discharge (HID) bulb or a halogen bulb.

The optical lens group 17 is configured to concentrate light emitted from the light source 15 to the reflective-type optical processor 19. The optical lens group 17 in the illustrated embodiment can be a single lens or a combination of multiple lenses, which is typically a convergent lens group.

The reflective-type optical processor 19 is configured to receive light emitted from the light source 15 and concentrated by the optical lens group 17 as incident light, receive a control signal output from the image process and control component 13, and performs a reflective-type spatial distribution modulation onto the incident light according to the control signal in order to obtain target output light with an optical distribution pattern corresponding to the dynamic image for projecting out. In the illustrated embodiment, the reflective-type optical processor 19 can include a digital micromirror device (DMD) chip, the DMD chip is a reflective-type optical switch array device that typically includes a reflective micromirror array as a digital reflective optical switch array. Specifically, for instance, when the image sensor 11 detects a pedestrian or an animal is walking across the road in front, the image process and control component 13 can output a control signal to the reflective-type optical processor 19 for controlling a spatial distribution of the emission light, so as to intensify light spot superposition of an area where the pedestrian is for warning the pedestrian or the animal by glare or flash. Another example is when the image sensor 11 detects the road is about to turn around in the front, the image process and control component 13 can output the control signal to the reflective-type optical processor 19 for controlling spatial distribution of the emission light, coordinated with course of the road, to achieve an earlier target illumination and better optical distribution compared with a conventional adaptive frontlighting system (AFS). Still another example is when the image sensor 11 detects a vehicle is approaching from an opposite direction lane, the image process and control component 13 can output the control signal to the reflective-type optical processor 19 for controlling spatial distribution of the emission light so as to reduce or prevent illumination on the left area in front of the vehicle, which can prevent disturbance of driving view to the driver of the vehicle passing by in the opposite direction lane. Even still another example is when the image sensor 11 detects another vehicle in the same direction lane ahead, the image process and control component 13 can output the control signal to the reflective-type optical processor 19 for controlling spatial distribution of the emission light so as to reduce or prevent illumination on the middle area in front of the vehicle, which can prevent disturbance of sight from the rearview mirror of the vehicle ahead in the same direction lane.

Figure 2:
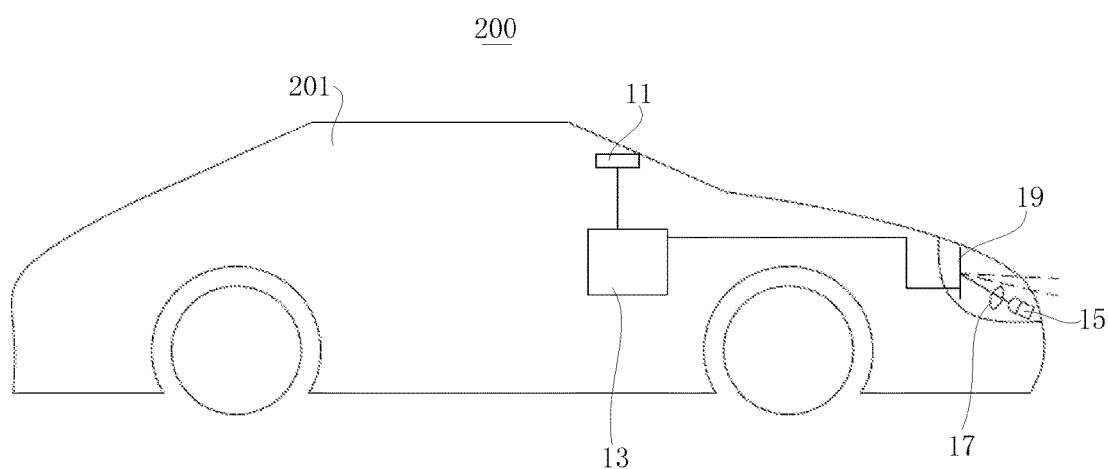
FIG. 2 is a structural schematic view of a vehicle adopting the vehicle headlight device shown in FIG. 1.

Referring to FIG. 2, FIG. 2 is a structural schematic view of a vehicle adopting the vehicle headlight device shown in FIG. 1. It can be seen from FIG. 1 and FIG. 2 that a vehicle 200 such as a car including a vehicle body 201 and the vehicle headlight device 10 mounted on the vehicle body 201. The image sensor 11 in the vehicle headlight device 10 can be mounted on an upper side of an internal surface of a front windshield of the vehicle body 201, the image process and control component 13 can be mounted on a foreside of the vehicle body 201 and electrically connected to the image sensor 11 and the reflective-type optical processor 19. The light source 15, the optical lens group 17 and the reflective-type optical processor 19 can be mounted on a position on the head of the vehicle body 201 where the vehicle headlight is.

Second Embodiment

Figure 3:
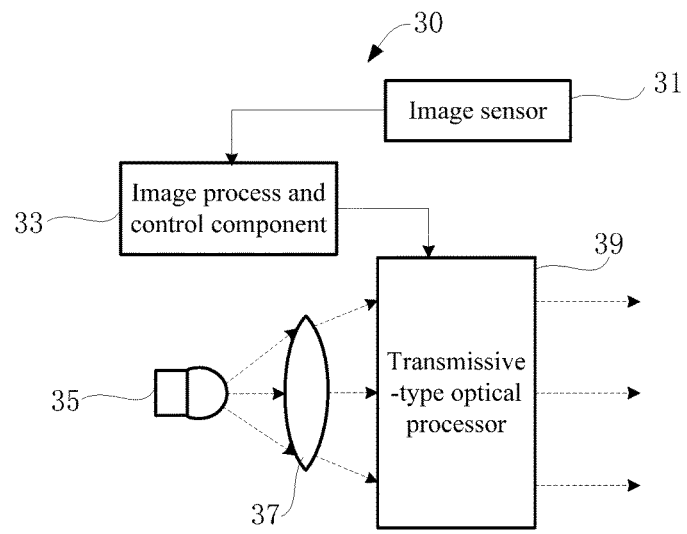
FIG. 3 is a principal structural schematic view of a vehicle headlight device according to a second embodiment of the invention.

Referring to FIG. 3, a vehicle headlight device 30 provided by a second embodiment of the invention includes an image sensor 31, an image process and control component 33, a light source 35, an optical lens group 37 and a transmissive-type optical processor 39.

The image sensor 31 is configured to collect a dynamic image in front of a vehicle. In the illustrated embodiment, the image sensor 31 may be a camera such as an infrared camera. Moreover, the image sensor 31 can further be a combination of a camera and a distance detector, which can collect the dynamic image in front of the vehicle as well as measuring a distance from the vehicle to another vehicle, a pedestrian or an animal in the same direction lane or an opposite direction lane ahead.

The image process and control component 33 is configured to receive the dynamic image collected by the image sensor 31 to be processed to output a control signal, which may include a processor chip such as an ARM microprocessor or a DSP processor. The image process and control component 33 analyzes and processes the dynamic images such as judging if a vehicle is driving in an opposite lane or in the same direction lane ahead, if a pedestrian or an animal is walking across the road, or if a crooked road appears ahead, and then generates a corresponding control signal as output according to the judging result.

The light source 35 is configured to provide light for illumination, which can be a LED bulb, a high intensity discharge bulb or a halogen bulb.

The optical lens group 37 is configured to concentrate light emitted from the light source 35 and emit the light to the transmissive-type optical processor 39. The optical lens group 37 in the embodiment can be a single lens or a combination of multiple lenses, which is typically a convergent lens set.

The transmissive-type optical processor 39 is configured to receive light emitted from the light source 35 and concentrated by the optical lens group 37 as incident light, receive the control signal output from the image process and control component 33, and performs a transmissive-type spatial distribution modulation onto the incident light according to the control signal in order to obtain emission light with an optical distribution pattern corresponding to the dynamic image for projecting out. In the illustrated embodiment, the transmissive-type optical processor 39 may include a transmissive-type liquid crystal panel, the transmissive-type liquid crystal panel is an optical switch array device that typically includes a pixel array as an optical switch array. More specifically, for instance, when the image sensor 31 detects a pedestrian or an animal is walking across the road in front, the image process and control component 33 can output the control signal to the transmissive-type optical processor 39 for controlling spatial distribution of the emission light, so as to intensify optical intensity of the area where the pedestrian is for warning the pedestrian or the animal by glare or flash. Another example is when the image sensor 31 detects the road is about to turn around in the front, the image process and control component 33 can output the control signal to the transmissive-type optical processor 39 for controlling spatial distribution of the emission light, coordinated with course of the road so as to achieve an ideal illumination. Still another example is when the image sensor 31 detects a vehicle is approaching from an opposite direction lane, the image process and control component 33 can output the control signal to the transmissive-type optical processor 39 for turning off the optical switch on left of the transmissive-type optical processor 39 so as to reduce or prevent illumination on the left area in front of the vehicle, which can prevent disturbance of driving view of the driver of the vehicle in the opposite direction lane. Even still another example is when the image sensor 31 detects another vehicle in the same direction lane ahead, the image process and control component 33 can output the control signal to the transmissive-type optical processor 39 for turning off the optical switch of the middle area of the transmissive-type optical processor 39 so as to reduce or prevent illumination on the middle area in front of the vehicle, which can prevent disturbance of sight from the rearview mirror of the vehicle in the front of the same direction lane.

Figure 4:
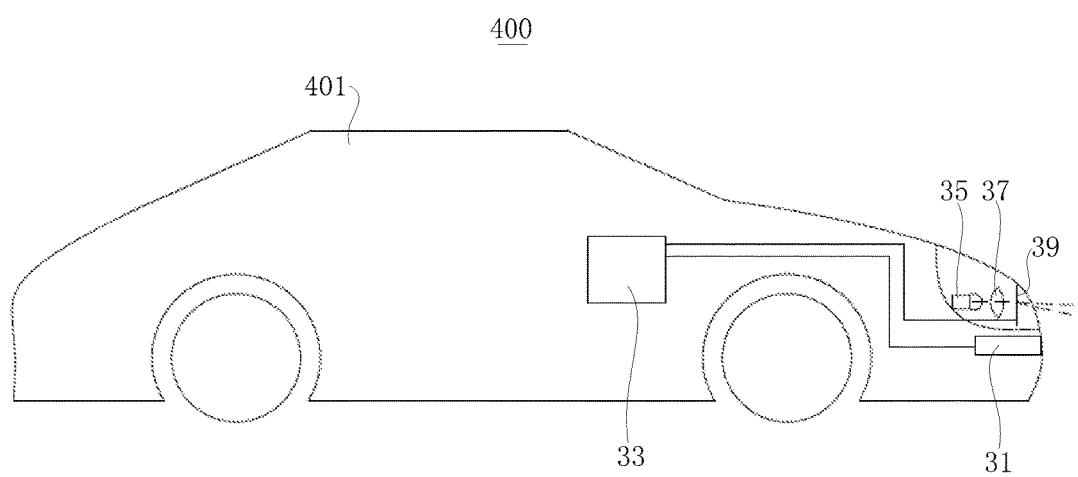
FIG. 4 is a structural schematic view of a vehicle adopting the vehicle headlight device shown in FIG. 3.

Referring to FIG. 4, FIG. 4 is a structural schematic view of a vehicle adopting the vehicle headlight device shown in FIG. 3. It can be seen from FIG. 3 and FIG. 4 that a vehicle 400 includes a vehicle body 401 and the vehicle headlight device 30 mounted on the vehicle body 401. The image sensor 31 in the vehicle headlight device 30 can be mounted on the head of the vehicle body 401, which can also be mounted on an upper side of an internal surface of a front windshield as shown in FIG. 2, the image process and control component 33 can be mounted on a foreside of the vehicle body 401 and electrically connected to the image sensor 31 and the transmissive-type optical processor 39. The light source 35, the optical lens group 37 and the transmissive-type optical processor 39 can be mounted on a position on the head of the vehicle body 401 where the vehicle headlight is.

It can be known from the first embodiment and the second embodiment that the optical lens group 17/37 and the vehicle headlight device 10/30 of the optical processor (the reflective-type optical processor 19 or the transmissive-type optical processor 39) in the invention can have following beneficial effects, compared with a conventional matrix LED headlight, that: a) the amount/number of the light source can be one, so as to simplify an optical structure of the entire vehicle headlight device; b) emitted optical spots can be divided into more parts, optical areas can easily exceed several hundreds of spots, which can control optical distribution more accurately, such as merely reducing or preventing rays radiating to the other vehicle without sacrificing a clear vision on the other vehicle; c) the headlight is unnecessary to be optically positioned accurately due to image feedback control, even if the vehicle body has a slight deformation, the projection can be adjusted to the preset area; d) the optical distribution controlled by the reflective-type optical processor can utilize degrees of superposition of emitted optical spots, optical intensity of the emitted spot can be easily controlled by software; and e) a required frontal projection surface is small, which can increase flexibility in vehicle design and reduce resistance on the windward side.

Third Embodiment

Figure 5:
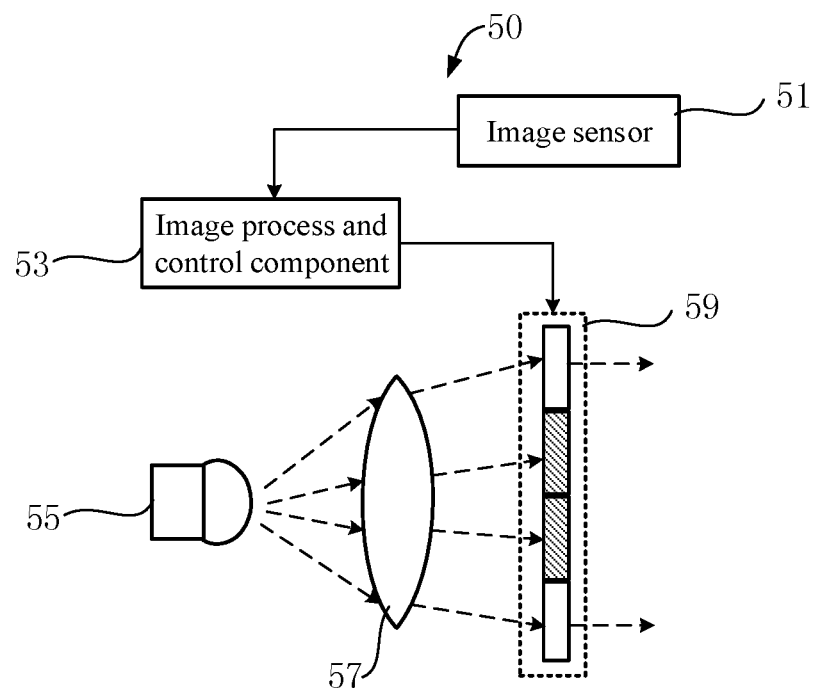
FIG. 5 is a principal structural schematic view of a vehicle headlight device according to a third embodiment of the invention.

Referring to FIG. 5, a vehicle headlight device 50 provided by a third embodiment of the invention includes an image sensor 51, an image process and control component 53, a light source 55, an optical lens group 57 and an opto-interrupter set 59.

The image sensor 51 is configured to collect a dynamic image in front of a vehicle. In the illustrated embodiment, the image sensor 51 may be a camera such as an infrared camera. Moreover, the image sensor 51 can further be a combination of a camera and a distance detector, which can collect the dynamic image in front of the vehicle as well as measuring a distance from the vehicle to another vehicle, a pedestrian or an animal in the same direction lane or in an opposite direction lane ahead.

The image process and control component 53 is configured to receive the dynamic image collected by the image sensor 51 to be processed to output a control signal, which may include a processor chip such as an ARM microprocessor or a DSP processor. The image process and control component 53 analyzes and processes the dynamic images such as judging if a vehicle is driving the opposite direction or in the same lane ahead, if a pedestrian or an animal is walking across the road, or if a crooked road appears ahead, and then generates a corresponding control signal is generated as output according to the judging result.

The light source 55 is configured to provide light for illumination, which can be a LED bulb, a high-intensity discharge bulb or a halogen bulb.

The optical lens group 57 is configured to concentrate light emitted from the light source 55 and emit the light to the opto-interrupter set 59. The optical lens group 57 in the embodiment can be a single lens or a combination of multiple lenses, which is typically a convergent lens group.

The opto-interrupter set 59 is configured to receive light emitted from the light source 55 and concentrated by the optical lens group 57 to be incident light, receive a control signal output from the image process and control component 53, and the incident light is selectively to be prevented or permitted to pass (or performed with spatial distribution modulation) in order to obtain an emission light with an optical distribution pattern corresponding to the dynamic image for projecting out. In the illustrated embodiment, the opto-interrupter set 59 includes a plurality of independently controlled opto-interrupters such as a plurality of liquid crystal light valves (FIG. 5 merely shows four as an example rather than as a limitation) to be an optical switch array. Accordingly, each of the liquid crystal light valves is optional to be turned on or turned off under the control of the control signal, which can achieve a required emission light spatial distribution pattern by sheltering light on partial areas or without sheltering, so as to achieve optical blocking or projection on each target area. Moreover, the plurality of independently controlled opto-interrupters can be arranged in a straight line manner or in an arc manner. Specifically, for instance, when the image sensor 51 detects a pedestrian or an animal is walking across the road ahead, the image process and control component 53 can output the control signal to the opto-interrupter set 59 for controlling a spatial distribution of the emission light, so as to intensify optical intensity of the area where the pedestrian is for warning the pedestrian or the animal by glare or flash. Another example is when the image sensor 51 detects the road is about to turn around in the front, the image process and control component 53 can output the control signal to the opto-interrupter set 59 for controlling spatial distribution of the emission light, coordinated with course of the road to achieve an ideal illumination. Still another example is when the image sensor 51 detects a vehicle is approaching from an opposite direction lane, the image process and control component 53 can output control signal to the opto-interrupter set 59 for controlling emission light spatial distribution to block optical projection on the left of the vehicle in the front, which can prevent disturbance of driving view of the driver of the vehicle passing by in the opposite direction lane. Even still another example is when the image sensor 51 detects another vehicle in the same lane in the front, the image process and control component 53 can output the control signal to the opto-interrupter set 59 for controlling emission light spatial distribution to block illumination on the middle area in front of the vehicle (such as two middle liquid crystal light valves shown in FIG. 5 are turned off), which can prevent disturbance of sight from the rearview mirrors of the vehicle in the front of the same direction lane.

Fourth Embodiment

Figure 6:
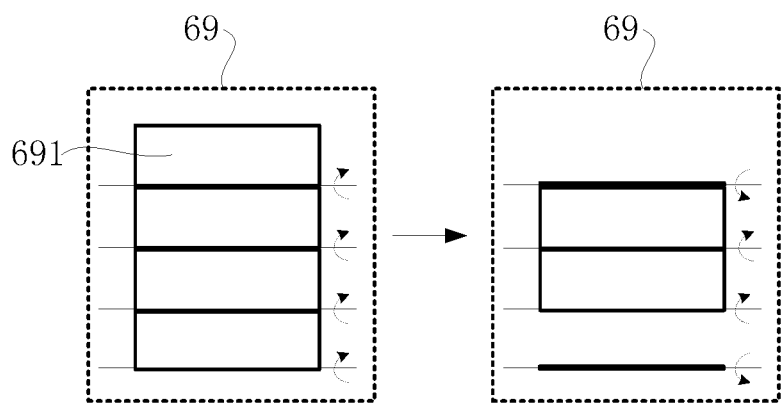
FIG. 6 is a schematic view of an operational state variation process of an opto-interrupter set in a vehicle headlight device according to a fourth embodiment of the invention.

Referring to FIG. 6, FIG. 6 is a schematic view of an operational state variation process of an opto-interrupter set in a vehicle headlight device according to a fourth embodiment of the invention. A structure of the vehicle headlight device in the fourth embodiment of the invention is basically identical to that of the vehicle headlight device 50 shown in FIG. 5, a difference is a specific structure of the opto-interrupter set. Specifically, as shown in FIG. 6, an opto-interrupter set 69 of the embodiment includes several such as four independently controlled mechanically rotatable baffles 691 as optical switch array devices, each of the mechanically rotatable baffles 691 can rotate on a direction shown by a dotted arrow in FIG. 6 under the control of the control signal, which can be selectively to prevent or permit light rays to pass. Specifically, the left side in FIG. 6 are four mechanically rotatable baffles 691 that are in block status (four optical switches are turned off correspondingly), so that incident light radiated on the opto-interrupter set 69 cannot go through. When only light rays in the middle area are needed to be blocked, the two mechanically rotatable baffles 691 on two sides of the opto-interrupter set 69 can be controlled to rotate through 90 degrees, shown as the right side in FIG. 6, light rays on the two sides are permitted to go through, which can achieve a similar effect of light emission shown in FIG. 5.

Fifth Embodiment

Figure 7:
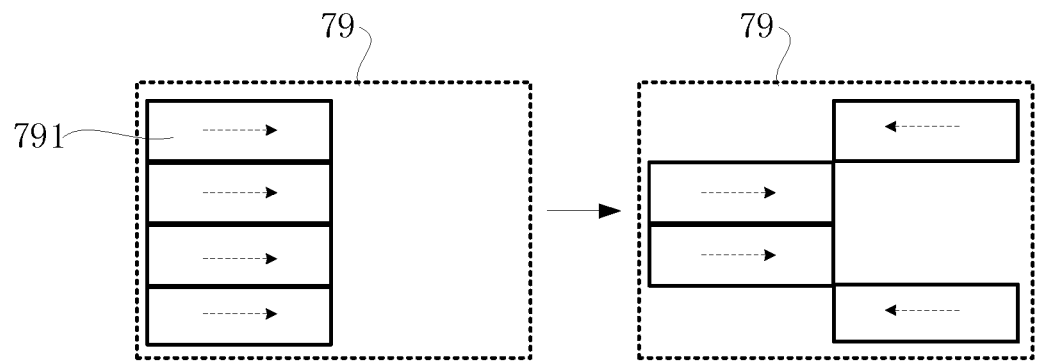
FIG. 7 is a schematic view of an operational state variation process of an opto-interrupter set in a vehicle headlight device according to a fifth embodiment of the invention.

Referring to FIG. 7, FIG. 7 is a schematic view of an operational state variation process of an opto-interrupter set in a vehicle headlight device according to a fifth embodiment of the invention. A structure of the vehicle headlight device in the fifth embodiment of the invention is basically identical to that of the vehicle headlight device 50 shown in FIG. 5, a difference is a specific structure of the opto-interrupter set. Specifically, as shown in FIG. 7, an opto-interrupter set 79 of the embodiment includes several such as four separately controlled mechanically slidable baffles 791 as optical switch array devices, each of the mechanically slidable baffles 791 can slide on a direction shown by a dotted arrow in FIG. 7 under the control of the control signal, which can be optional to prevent or permit light rays to pass. Specifically, the left side in FIG. 7 shows four mechanically slidable baffles 791 that are all in shelter status (four optical switches are turned off correspondingly), so that incident light radiated on the opto-interrupter set 79 cannot go through. When only rays in the middle area are needed to be blocked, the two mechanically slidable baffles 791 on two sides of the opto-interrupter set 79 can be controlled to slide to the right, shown as the right side in FIG. 7, only light rays on the two sides are permitted to go through, which can achieve a similar effect of light emission shown in FIG. 5. Moreover, it can be understood that each of the mechanically slidable baffles 791 in the opto-interrupter set 79 can also be substituted by a pair of mechanically slidable baffles arranged parallel on right and left, the optical switch can be turned on or turned off by controlling the pair of mechanically slidable baffles to slide towards or opposite.

Sixth Embodiment

Figure 8:
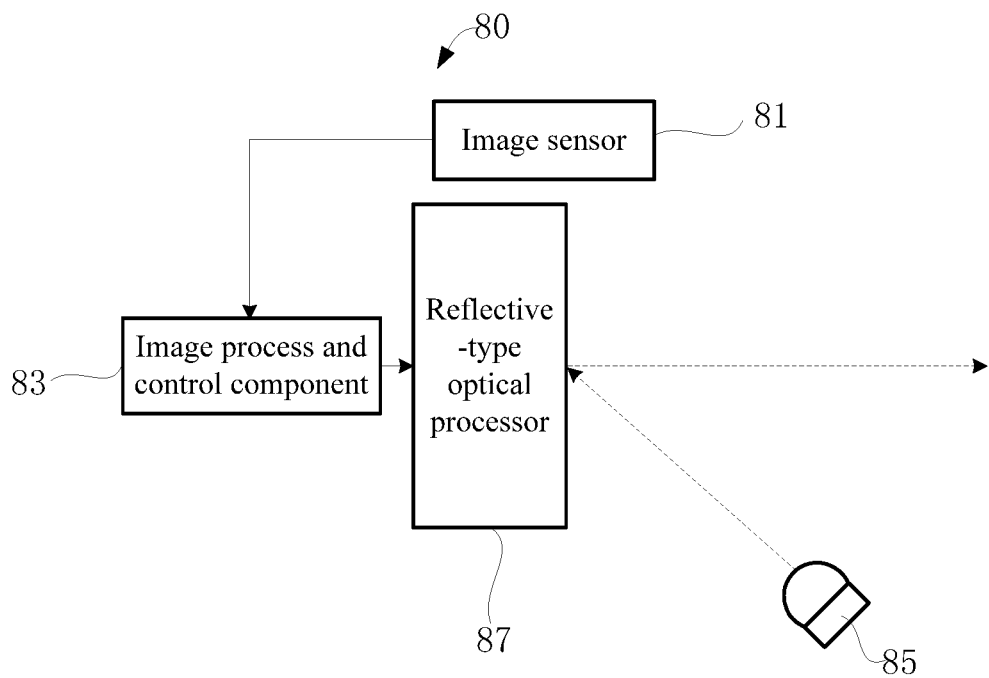
FIG. 8 is a principal structural schematic view of a vehicle headlight device according to a sixth embodiment of the invention.

Referring to FIG. 8, a vehicle headlight device 80 provided by the sixth embodiment of the invention includes an image sensor 81, an image process and control component 83, a light source 85 and a reflective-type optical processor 87.

The image sensor 81 is configured (i.e., structured and arranged) to collect a dynamic image in front of a vehicle. In the illustrated embodiment, the image sensor 81 may be a camera such as an infrared camera. Moreover, the image sensor 81 can further be a combination of a camera and a distance detector, which can collect the dynamic image in front of the vehicle as well as measuring/detecting a distance from the vehicle to another vehicle, a pedestrian or an animal in the same direction lane or in an opposite direction lane ahead.

The image process and control component 83 is configured to receive the dynamic image collected by the image sensor 81 that will be analyzed and processed so as to output a control signal, which may include a processor chip such as an ARM microprocessor or a DSP processor. The image process and control component 83 analyzes and processes the dynamic images such as judging if a vehicle is driving in the opposite direction or in the same direction lane ahead, if a pedestrian or an animal is walking across the road, or if a crooked road appears ahead, and then generates a corresponding control signal as output according to the judging result.

The light source 85 is configured to provide light for illumination to the reflective optical processor 87. The light source 85 is a laser light source such as a laser diode and a laser tube.

The reflective-type optical processor 87 is configured to receive light emitted from the light source 85 as an incident light, receive the control signal output from the image process and control component 83, and performs a reflective-type spatial distribution modulation onto the incident light according to the control signal to obtain target output light with an optical distribution pattern corresponding to the dynamic image for projecting out. In the illustrated embodiment, the reflective-type optical processor 87 can include a digital micromirror device (DMD) chip. The DMD chip is a reflective-type optical switch array device that typically includes a reflective micromirror array as a digital reflective optical switch array. Specifically, for instance, when the image sensor 81 detects a pedestrian or an animal is walking across the road in front, the image process and control component 83 can output a control signal to the reflective-type optical processor 87 for controlling a spatial distribution of the emission/output light, so as to intensify light spot superposition of an area where the pedestrian is for warning the pedestrian or the animal by glare or flash. Another example is when the image sensor 81 detects the road is about to turn around in the front, the image process and control component 83 can output the control signal to the reflective-type optical processor 87 for controlling spatial distribution of the emission light, coordinated with course of the road, to achieve an earlier target illumination and better optical distribution compared with a conventional adaptive frontlighting system (AFS). Still another example is when the image sensor 81 detects a vehicle is approaching from an opposite direction lane, the image process and control component 83 can output the control signal to the reflective-type optical processor 87 for controlling spatial distribution of the emission light so as to reduce or prevent illumination on the left area in front of the vehicle, which can prevent disturbance of driving view to the driver of the vehicle passing by in the opposite direction lane. Even still another example is when the image sensor 81 detects another vehicle in the same direction lane ahead, the image process and control component 83 can output the control signal to the reflective-type optical processor 87 for controlling spatial distribution of the emission light so as to reduce or prevent illumination on the middle area in front of the vehicle, which can prevent disturbance of sight from the rearview mirrors of the vehicle ahead in the same direction lane.

Seventh Embodiment

Figure 9:
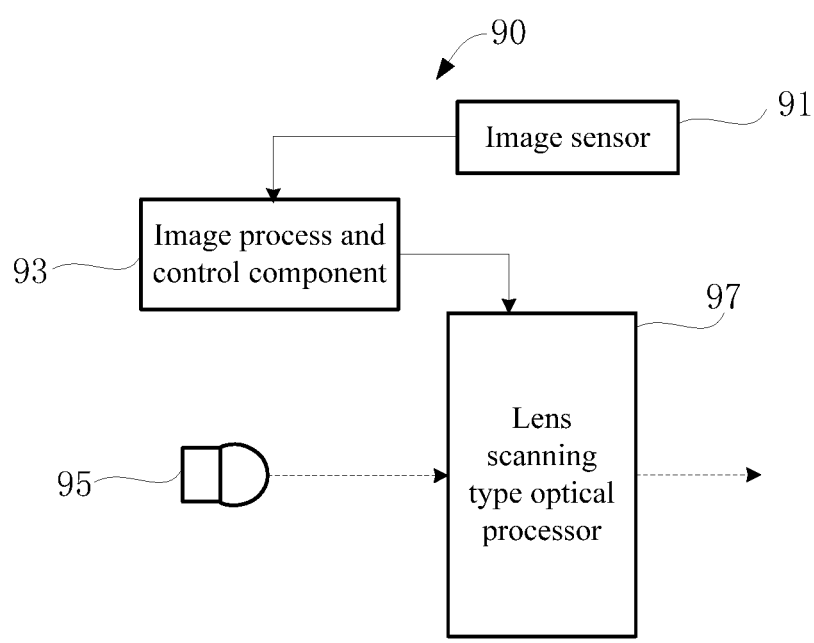
FIG. 9 is a principal structural schematic view of a vehicle headlight device according to a seventh embodiment of the invention.

Referring to FIG. 9, a vehicle headlight device 90 provided by the seventh embodiment of the invention includes an image sensor 91, an image process and control component 93, a light source 95 and a lens scanning type optical processor 97. Herein, it should be understood that the lens scanning type optical processor 97 is a type of transmissive-type optical processor allowing light to pass therethrough.

The image sensor 91 is configured to collect a dynamic image in front of a vehicle. In the illustrated embodiment, the image sensor 91 may be a camera such as an infrared camera. Moreover, the image sensor 91 can further be a combination of a camera and a distance detector, which can collect the dynamic image in front of the vehicle as well as measuring a distance from the vehicle to another vehicle, a pedestrian or an animal in the same direction lane or an opposite direction lane ahead.

The image process and control component 93 is configured to receive the dynamic image collected by the image sensor 91 to be processed to output a control signal, which can include a processor chip such as an ARM microprocessor or a DSP processor. The image process and control component 93 analyzes and processes the dynamic images such as judging if a vehicle is driving in an opposite lane or in the same direction lane ahead, if a pedestrian or an animal is walking across the road, or if a crooked road appears ahead, and then generates a corresponding control signal as output according to the judging result.

The light source 95 is configured to provide light for illumination to the lens scanning type optical processor 97, the light source 95 is a laser light source such as a laser diode or a laser tube.

The lens scanning type optical processor 97 is configured to receive light emitted from the light source 95 as incident light, receive the control signal output from the image process and control component 93, and performs a transmissive-type spatial distribution modulation onto the incident light by movement e.g., angle deflection according to the control signal in order to obtain emission light with an optical distribution pattern corresponding to the dynamic image for projecting out. In the illustrated embodiment, the lens scanning type optical processor 97 may include a lens group including one lens or multiple lenses and being movable relative to the light source 95, so that different angle deflections would cause different propagation directions of the emission light. More specifically, for instance, when the image sensor 91 detects a pedestrian or an animal is walking across the road in front, the image process and control component 93 can output the control signal to the lens scanning type optical processor 97 for controlling spatial distribution of the emission light, so as to intensify optical intensity of the area where the pedestrian is for warning the pedestrian or the animal by glare. Another example is when the image sensor 91 detects the road is about to turn around in the front, the image process and control component 93 can output the control signal to the lens scanning type optical processor 97 for controlling spatial distribution of the emission light, coordinated with course of the road so as to achieve an ideal illumination. Still another example is when the image sensor 91 detects a vehicle is approaching from an opposite direction lane, the image process and control component 93 can output the control signal to the lens scanning type optical processor 97 for deflecting the light struck on the lens scanning type optical processor 97 so as to reduce or prevent illumination on the left area in front of the vehicle, which can prevent disturbance of driving view of the driver of the vehicle in the opposite direction lane. Even still another example is when the image sensor 91 detects another vehicle in the same direction lane ahead, the image process and control component 93 can output the control signal to the lens scanning type optical processor 97 for deflecting the light struck on the lens scanning type optical processor 97 at a certain angle so as to reduce or prevent illumination on the middle area in front of the vehicle, which can prevent disturbance of sight from the rearview mirrors of the vehicle in the front of the same direction lane.

In summary, according to the above mentioned embodiments of the invention, the optical lens group (optionally) disposed in the vehicle headlight device concentrates light emitted from the light source as the incident light, the image sensor detects the dynamic image in front of the vehicle and sends the image to the image process and control component for analyzing and processing so as to obtain the corresponding control signal, then the optical switch array device (such as the reflective-type optical processor 19, 87, the transmissive-type optical processor 39, the opto-interrupter sets 59, 69 and 79) or the lens scanning type optical processor 97 is controlled by the control signal to process the incident light by the spatial distribution modulation for obtaining the emission light with the optical distribution pattern corresponding to the dynamic image, therefore it is unnecessary to turn on/turn off the light source frequently but still can reinforce, weaken or prevent light projection on the target area in front of the vehicle, the driver can achieve the optimum view without affecting the vehicle ahead.

The above description illustrates preferred embodiments of the invention rather than any limitation, though the preferred embodiments are disclosed previously, the invention needs not be limited to the disclosed embodiments. For those skilled persons in the art, various modifications and variations can be made according to the concept of the invention. It is intended to cover various modifications and similar arrangements included within the spirit and scope of the appended claims that are to be accorded with the broadest interpretation so as to encompass all such modifications and similar structures.

What is claimed is:

1. A vehicle headlight device, comprising a light source; wherein the vehicle headlight device further comprises:
   an image sensor, configured to detect a dynamic image in front of a vehicle;
   an image process and control component, electrically connected to the image sensor and configured to analyze and process the dynamic image to thereby output a control signal;
   an optical lens group, configured to concentrate light emitted from the light source as an incident light;
   an optical switch array device, electrically connected to the image process and control component and configured to process the incident light by spatial distribution modulation under the control of the control signal to obtain an emission light with an optical distribution pattern corresponding to the dynamic image and thereby reinforce, weaken or prevent illumination on a target area in front of the vehicle;
   wherein the optical switch array device is a transmissive-type optical processor, and the transmissive-type optical processor is configured to process the incident light by transmissive-type spatial distribution modulation under the control of the control signal.

2. The vehicle headlight device according to claim 1, wherein the transmissive-type optical processor comprises a transmissive-type liquid crystal panel.

3. A vehicle headlight device, comprising a light source; wherein the vehicle headlight device further comprises:
   an image sensor, configured to detect a dynamic image in front of a vehicle;
   an image process and control component, electrically connected to the image sensor and configured to analyze and process the dynamic image to thereby output a control signal;
   an optical lens group, configured to concentrate light emitted from the light source as an incident light;
   an optical switch array device, electrically connected to the image process and control component and configured to process the incident light by spatial distribution modulation under the control of the control signal to obtain an emission light with an optical distribution pattern corresponding to the dynamic image and thereby reinforce, weaken or prevent illumination on a target area in front of the vehicle;
   wherein the optical switch array device is an opto-interrupter set, and the opto-interrupter set comprises a plurality of independently controlled opto-interrupters; each of the opto-interrupters is selective to be turned on or turned off under the control of the control signal in order to permit or prevent passing of the incident light respectively.

4. The vehicle headlight device according to claim 3, wherein each of the opto-interrupters is a liquid crystal light valve.

5. The vehicle headlight device according to claim 3, wherein each of the opto-interrupters is a mechanically rotatable or slidable baffle, and the mechanically rotatable or slidable baffle is capable of rotating or sliding under the control of the control signal in order to be selectively turned on or turned off for permitting or preventing passing of the incident light.

6. The vehicle headlight device according to claim 1, wherein the image sensor comprises a camera, the light source is a LED bulb, a high-intensity discharge bulb or a halogen bulb, the optical lens group is a convergent lens group.

7. A vehicle, comprising a vehicle body and a vehicle headlight device mounted on the vehicle body, the vehicle headlight device comprising a light source, wherein the vehicle headlight device further comprises:
- an image sensor, configured to detect a dynamic image in front of a vehicle;
- an image process and control component, electrically connected to the image sensor and configured to analyze and process the dynamic image to thereby output a control signal;
- an optical lens group, configured to concentrate light emitted from the light source as an incident light;
- an optical switch array device, electrically connected to the image process and control component and configured to process the incident light by spatial distribution modulation under the control of the control signal to obtain an emission light with an optical distribution pattern corresponding to the dynamic image and thereby reinforce, weaken or prevent illumination on a target area in front of the vehicle;
- wherein the optical switch array device is a transmissive-type optical processor, and the transmissive-type optical processor is configured to process the incident light by transmissive-type spatial distribution modulation under the control of the control signal.

8. The vehicle according to claim 7, wherein the transmissive-type optical processor comprises a transmissive-type liquid crystal panel.

9. The vehicle according to claim 7, wherein the image sensor comprises a camera, the light source is a LED bulb, a high-intensity discharge bulb or a halogen bulb, the optical lens group is a convergent lens group.

10. The vehicle headlight device according to claim 3, wherein the image sensor comprises an infrared camera.

11. The vehicle headlight device according to claim 3, wherein the light source is a LED bulb, a high-intensity discharge bulb or a halogen bulb.

12. The vehicle headlight device according to claim 3, wherein the optical lens group is a convergent lens group.

13. The vehicle according to claim 7, wherein the image sensor comprises an infrared camera.

14. The vehicle according to claim 7, wherein the light source is a LED bulb, a high-intensity discharge bulb or a halogen bulb.

15. The vehicle according to claim 7, wherein the optical lens group is a convergent lens group.

* * * * *